US012226884B2

(12) United States Patent
McClung et al.

(10) Patent No.: US 12,226,884 B2
(45) Date of Patent: Feb. 18, 2025

(54) HIGH RESOLUTION ANVIL ANGLE SENSOR

(71) Applicant: Ingersoll-Rand Industrial U.S., Inc., Davidson, NC (US)

(72) Inventors: Mark T. McClung, Andover, NJ (US); Daniel J. Becker, Monroe Township, NJ (US)

(73) Assignee: Ingersoll-Rand Industrial U.S., Inc., Davidson, NC (US)

( * ) Notice: Subject to any disclaimer, the term of this patent is extended or adjusted under 35 U.S.C. 154(b) by 394 days.

(21) Appl. No.: 17/536,815

(22) Filed: Nov. 29, 2021

(65) Prior Publication Data

US 2023/0166389 A1 Jun. 1, 2023

(51) Int. Cl.
*B25D 11/06* (2006.01)

(52) U.S. Cl.
CPC .... *B25D 11/068* (2013.01); *B25D 2217/0015* (2013.01); *B25D 2250/221* (2013.01)

(58) Field of Classification Search
CPC .......... B25D 11/068; B25D 2217/0015; B25D 2250/221; B25D 16/00; B25D 17/00; B25B 23/1475; B25B 21/026; G01B 7/30; G01B 11/26
See application file for complete search history.

(56) References Cited

U.S. PATENT DOCUMENTS 757,587 A 4/1904 Wilson
4,609,089 A 9/1986 Kobayashi et al.
6,371,218 B1 4/2002 Amano et al.
6,508,313 B1 1/2003 Carney et al.
6,598,684 B2 7/2003 Watanabe
(Continued)

FOREIGN PATENT DOCUMENTS

DE 102014116032 A1 5/2016
EP 3437801 A1 2/2019
(Continued)

OTHER PUBLICATIONS

Extended European Search Report for EP18186687.2, dated Jan. 4, 2019.

(Continued)

*Primary Examiner* — Hemant Desai
*Assistant Examiner* — Mobeen Ahmed
(74) *Attorney, Agent, or Firm* — Kevin E. West; Advent, LLP

(57) ABSTRACT

A rotary power tool assembly including a hammercase an axis extending between a forward end and a rearward end, a drive mechanism housed within the hammercase, and a hammer driven by the drive mechanism to apply a rotational impact force on an anvil. The anvil includes an output shaft rotatable about the axis, a plurality of anvil jaws extending from the axis, and a flange fixedly connected to an end of the output shaft and extending radially from the axis, wherein the flange supports the plurality of anvil jaws, the flange extending over the plurality of anvil jaws. The anvil includes a magnet attached to the flange opposite to the plurality of anvil jaws. An anvil angle sensor is configured to read and interpret magnetic flux changes of the magnet and determine the position of the anvil rotating about the axis.

20 Claims, 11 Drawing Sheets

(56) References Cited

U.S. PATENT DOCUMENTS

| | | | | |
|---|---|---|---|---|
| 6,607,041 | B2 | 8/2003 | Suzuki et al. | |
| 6,868,742 | B2 | 3/2005 | Schoeps | |
| 7,011,000 | B2 | 3/2006 | Kushida et al. | |
| 7,275,450 | B2 | 10/2007 | Hirai et al. | |
| 7,453,225 | B2 | 11/2008 | Friberg | |
| 7,556,103 | B2 | 7/2009 | Matsunaga | |
| 7,650,791 | B2 | 1/2010 | Cioto et al. | |
| 7,708,085 | B2 | 5/2010 | DeCicco et al. | |
| 7,735,398 | B2 | 6/2010 | Hsu et al. | |
| 7,757,587 | B2 | 7/2010 | Kaneyama et al. | |
| 7,823,486 | B2 | 11/2010 | Wise | |
| 8,104,546 | B2 | 1/2012 | Aeberhard | |
| 8,851,201 | B2 | 10/2014 | Limberg et al. | |
| 8,881,842 | B2 | 11/2014 | Borinato et al. | |
| 8,919,456 | B2 | 12/2014 | Ng et al. | |
| 8,985,241 | B2 | 3/2015 | Pozgay et al. | |
| 8,991,518 | B2 | 3/2015 | Elsmark | |
| 9,038,743 | B2 | 5/2015 | Aoki | |
| 9,149,917 | B2 | 10/2015 | Beer et al. | |
| 9,193,055 | B2 | 11/2015 | Lim et al. | |
| 9,233,457 | B2 | 1/2016 | Wanek et al. | |
| 9,261,420 | B2 | 2/2016 | Lee et al. | |
| 9,266,178 | B2 | 2/2016 | Eshleman et al. | |
| 9,296,095 | B2 | 3/2016 | Yoshino et al. | |
| 9,352,456 | B2 | 5/2016 | Murthy et al. | |
| 11,951,596 | B2 * | 4/2024 | Schneider ................. | B25F 5/02 |
| 2009/0071671 | A1 | 3/2009 | Zhong et al. | |
| 2009/0250233 | A1 | 10/2009 | Wallace | |
| 2010/0263890 | A1 | 10/2010 | Profunser et al. | |
| 2012/0222876 | A1 | 9/2012 | Schmidt et al. | |
| 2012/0234566 | A1 * | 9/2012 | Mashiko ................. | B25B 21/02 173/93.5 |
| 2012/0279362 | A1 | 11/2012 | Cummings et al. | |
| 2013/0075121 | A1 | 3/2013 | Nakamura et al. | |
| 2013/0228353 | A1 | 9/2013 | Chen et al. | |
| 2013/0333910 | A1 | 12/2013 | Tanimoto et al. | |
| 2014/0158390 | A1 | 6/2014 | Mashiko et al. | |
| 2014/0338939 | A1 | 11/2014 | Shi | |
| 2014/0367134 | A1 | 12/2014 | Phillips et al. | |
| 2015/0014010 | A1 | 1/2015 | Chang | |
| 2015/0021062 | A1 | 1/2015 | Sekino et al. | |
| 2015/0041163 | A1 | 2/2015 | McClung | |
| 2015/0231771 | A1 | 8/2015 | Sakai et al. | |
| 2015/0266170 | A1 | 9/2015 | Weller | |
| 2015/0336248 | A1 | 11/2015 | Goe | |
| 2015/0336249 | A1 | 11/2015 | Iwata et al. | |
| 2015/0352698 | A1 | 12/2015 | Hsu | |
| 2015/0352699 | A1 | 12/2015 | Sakai et al. | |
| 2016/0121467 | A1 * | 5/2016 | Ng ...................... | B25B 23/1475 81/464 |
| 2016/0207180 | A1 | 7/2016 | Hohmann et al. | |
| 2016/0229037 | A1 | 8/2016 | Quigley | |
| 2016/0325415 | A1 | 11/2016 | Huber et al. | |
| 2017/0057064 | A1 | 3/2017 | Ishikawa et al. | |
| 2017/0144278 | A1 | 5/2017 | Nishikawa et al. | |
| 2017/0173768 | A1 * | 6/2017 | Dey, IV .................. | B25B 21/02 |
| 2017/0197302 | A1 | 7/2017 | Kobayashi | |
| 2017/0199509 | A1 | 7/2017 | Khalaf | |
| 2017/0246732 | A1 * | 8/2017 | Dey, IV .................. | B25B 21/02 |
| 2019/0030696 | A1 * | 1/2019 | Seith ....................... | B25B 21/02 |
| 2020/0180128 | A1 * | 6/2020 | Schneider .............. | B25D 11/06 |
| 2021/0187717 | A1 * | 6/2021 | McClung ................ | B25B 21/02 |
| 2021/0339361 | A1 * | 11/2021 | Abbott ................... | B25D 17/06 |
| 2021/0379743 | A1 * | 12/2021 | Schneider ............... | B25B 21/02 |

FOREIGN PATENT DOCUMENTS

| | | | | |
|---|---|---|---|---|
| JP | 2013215884 A | 10/2013 | | |
| WO | 02083366 A1 | 10/2002 | | |
| WO | 2021248703 A1 | 12/2021 | | |
| WO | WO-2021248073 A1 * | 12/2021 | ............. | B25B 21/02 |

OTHER PUBLICATIONS

Extended European Search Report for Application No. 22189923.0, dated Mar. 21, 2023.

* cited by examiner

HIGH RESOLUTION ANVIL ANGLE SENSOR

BACKGROUND

A rotary tool, such as an impact wrench, generally includes a housing or hammercase supporting a drive mechanism, an output shaft having a first end configured to engage a fastener and a second end having an anvil, and a drive mechanism operable to drive the output shaft. Generally, the operator operates the tool in a forward direction to thread the fastener into engagement with a workpiece, and in a reverse direction to unthread the fastener from the workpiece.

DRAWINGS

The Detailed Description is described with reference to the accompanying figures. The use of the same reference numbers in different instances in the description and the figures may indicate similar or identical items.

Figure 1:
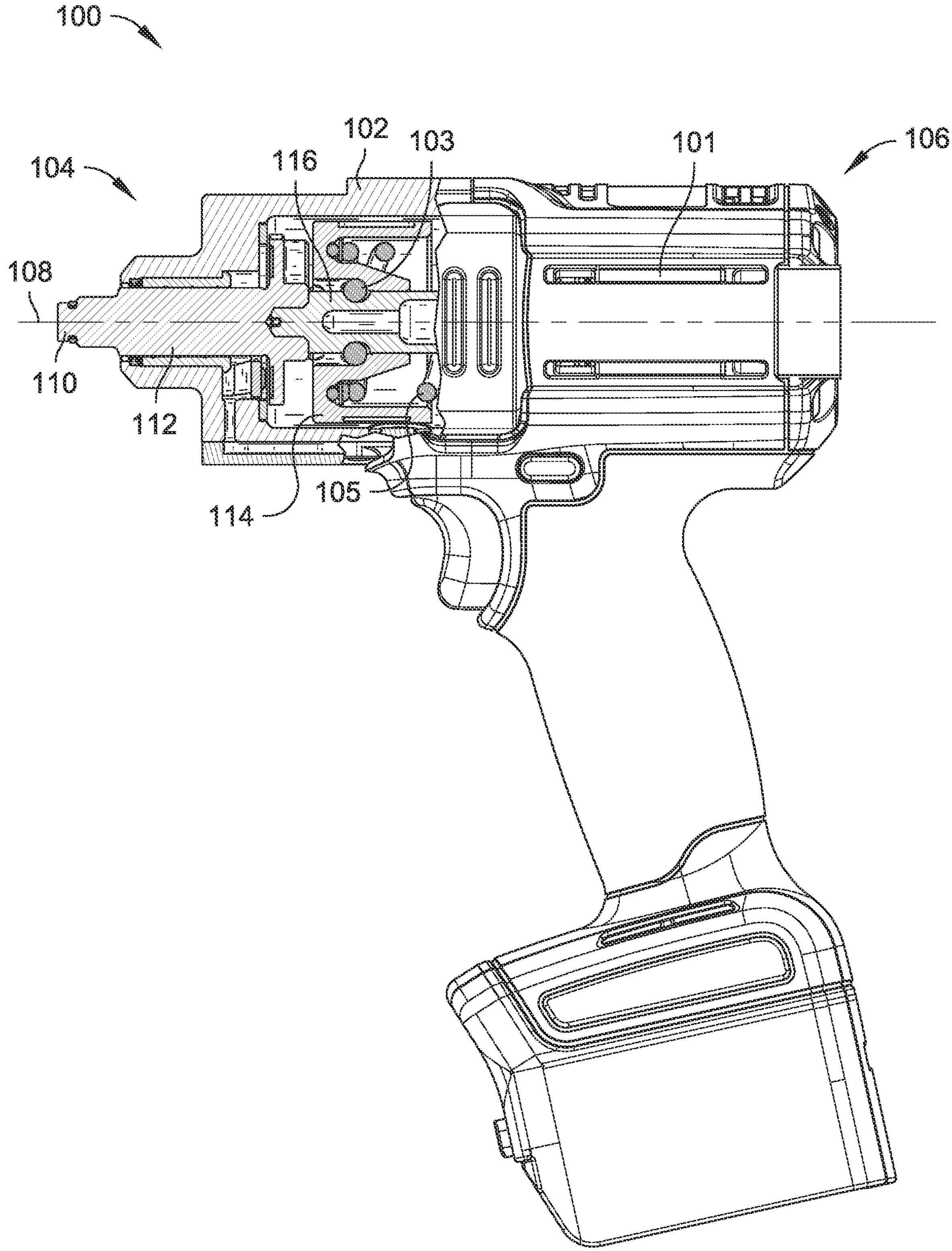
FIG. 1 is a partial cross-sectional side view illustrating a rotary power tool assembly in accordance with example embodiments of the present disclosure.
Figure 3:
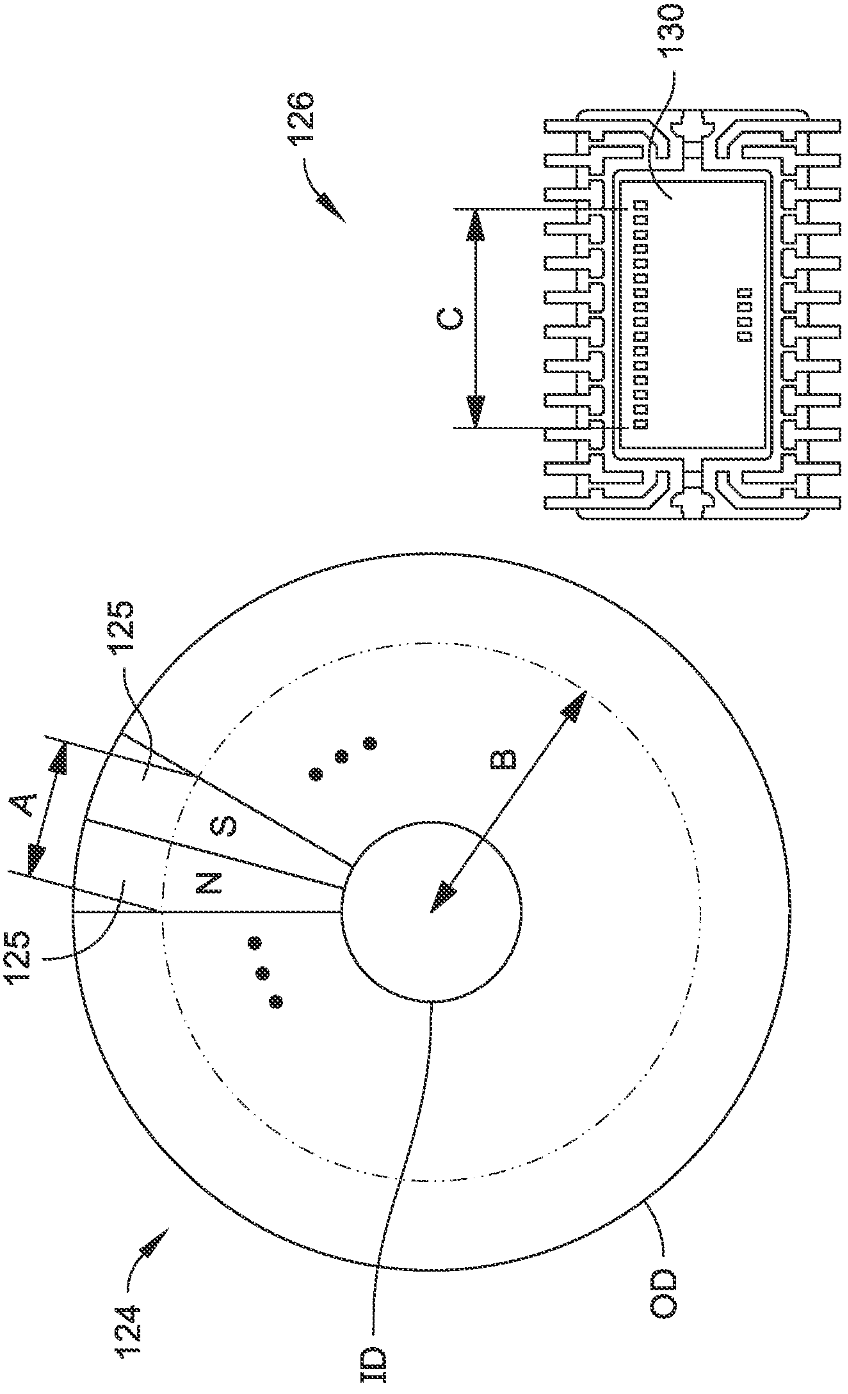
FIG. 3 is a diagrammatic illustration of a magnetic disc and a magnetic encoder sensor chip for measuring speed and position of an anvil, such as the anvil located in the rotary power tool assembly of FIG. 1, in accordance with example embodiments of the present disclosure.
Figure 6:
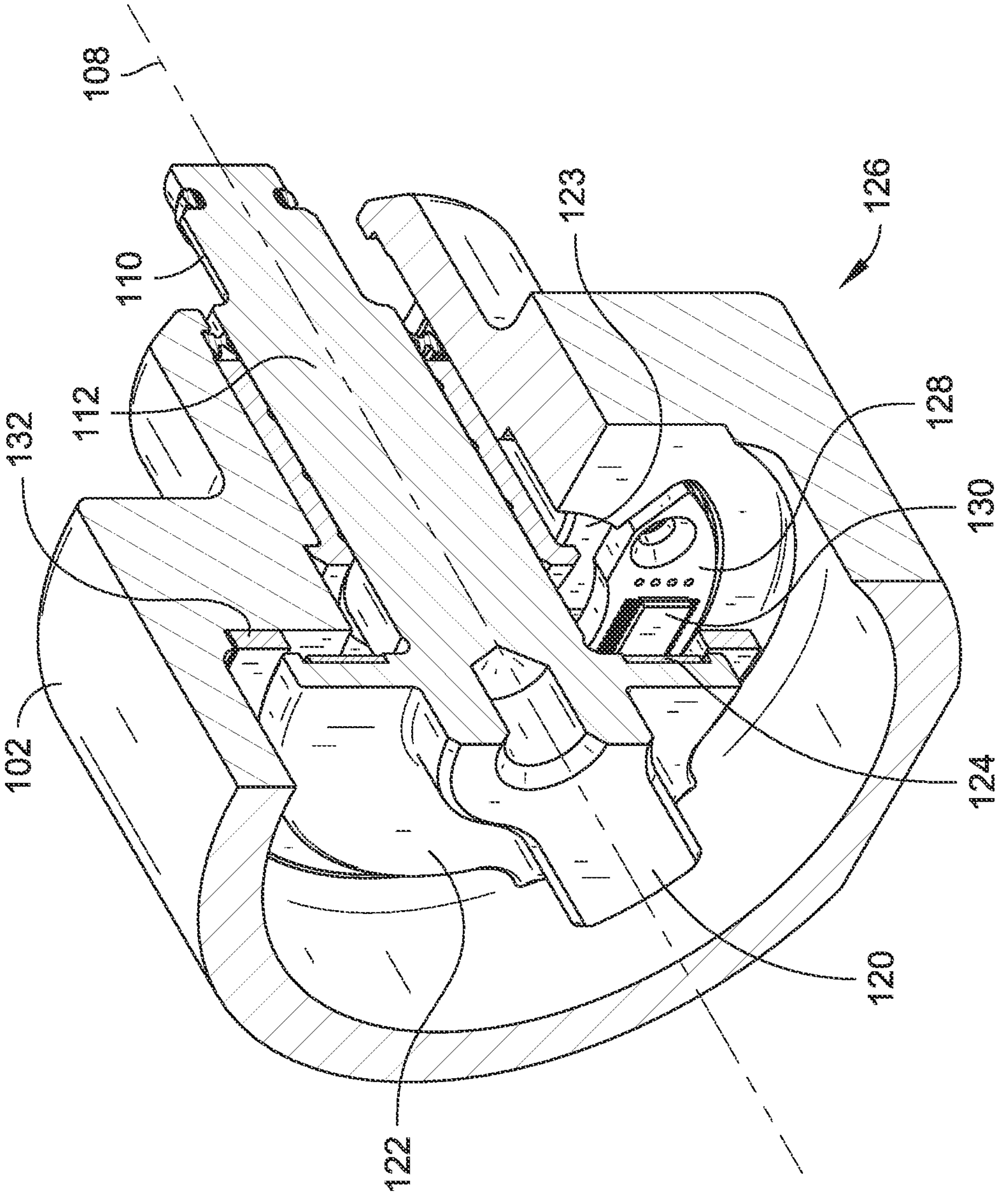

FIG. 6 is a partial cross-sectional perspective view illustrating the rotary power tool of FIG. 1 illustrating the anvil mounted within a hammercase of the rotary power tool assembly, having an anvil angle sensor having a magnetic encoder sensor chip, such as the one shown in FIG. 3, mounted on an inner surface of the hammercase and facing a disc magnet in accordance with example embodiments of the present disclosure.

Figure 7:
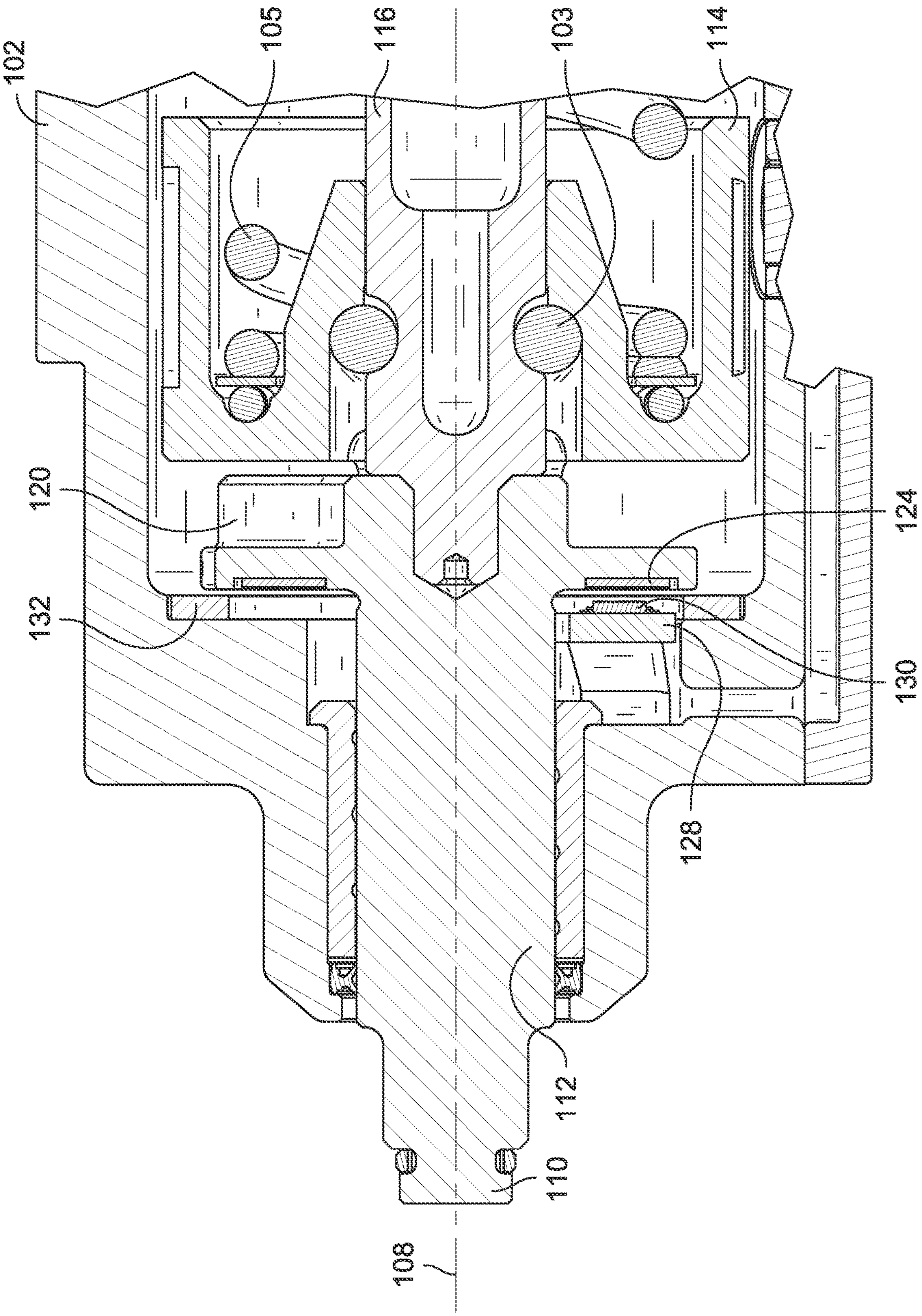

FIG. 7 is a partial cross-sectional side view of the rotary power tool of FIG. 6 showing the anvil angle sensor and the disc magnet in accordance with example embodiments of the present disclosure.

Figure 8:
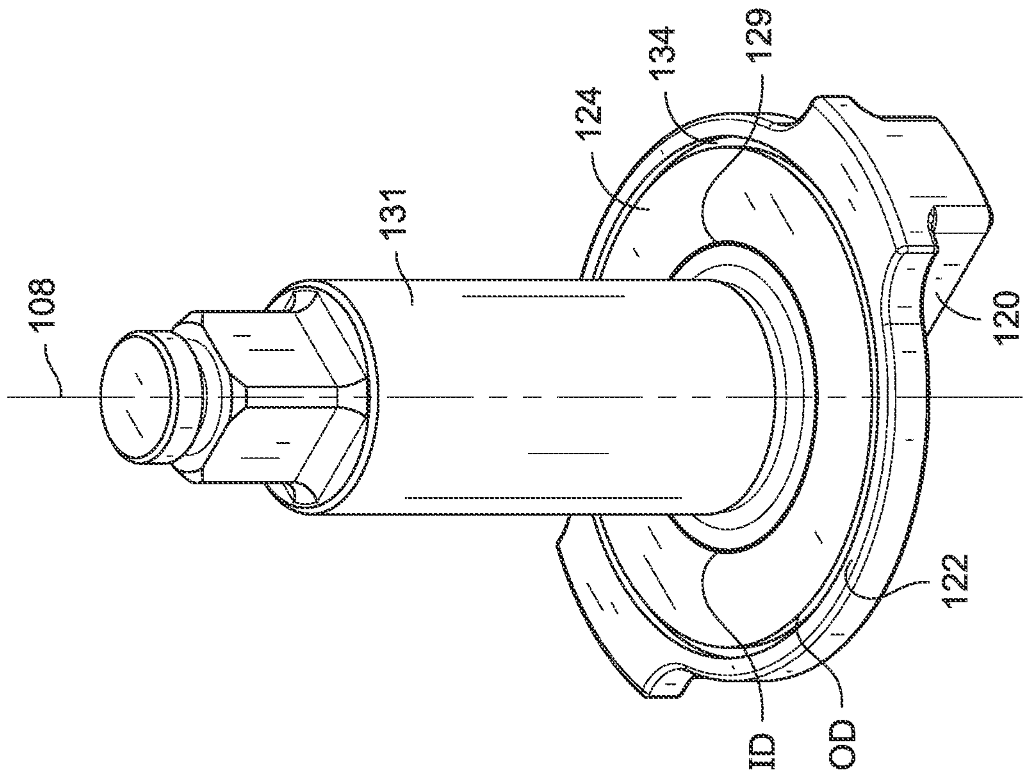

FIG. 8 is a perspective view of an anvil having flange and a magnet cavity and a disc magnet located within the magnet cavity, wherein the disc magnet is piloted on an inner diameter of the disc magnet in accordance with example embodiments of the present disclosure.

Figure 9:
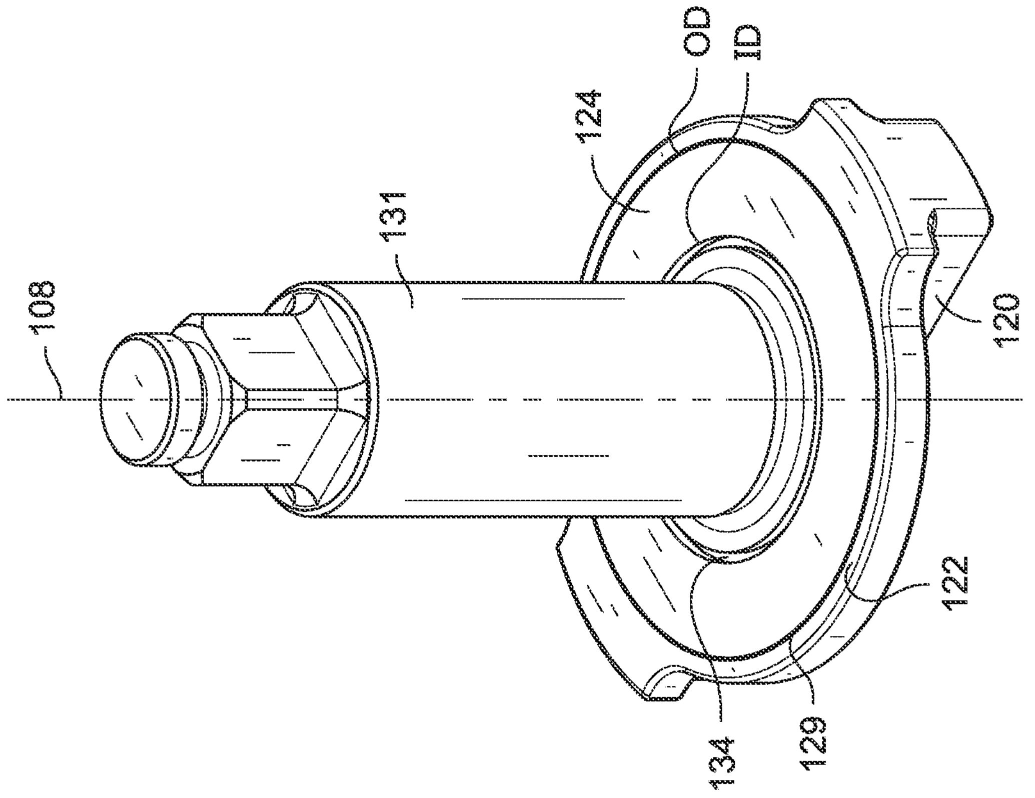

FIG. 9 is a perspective view of an anvil having a flange and a magnet cavity and a disc magnet located within the magnet cavity, wherein the disc magnet is piloted on an outer diameter of the disc magnet in accordance with example embodiments of the present disclosure.

Figure 11:
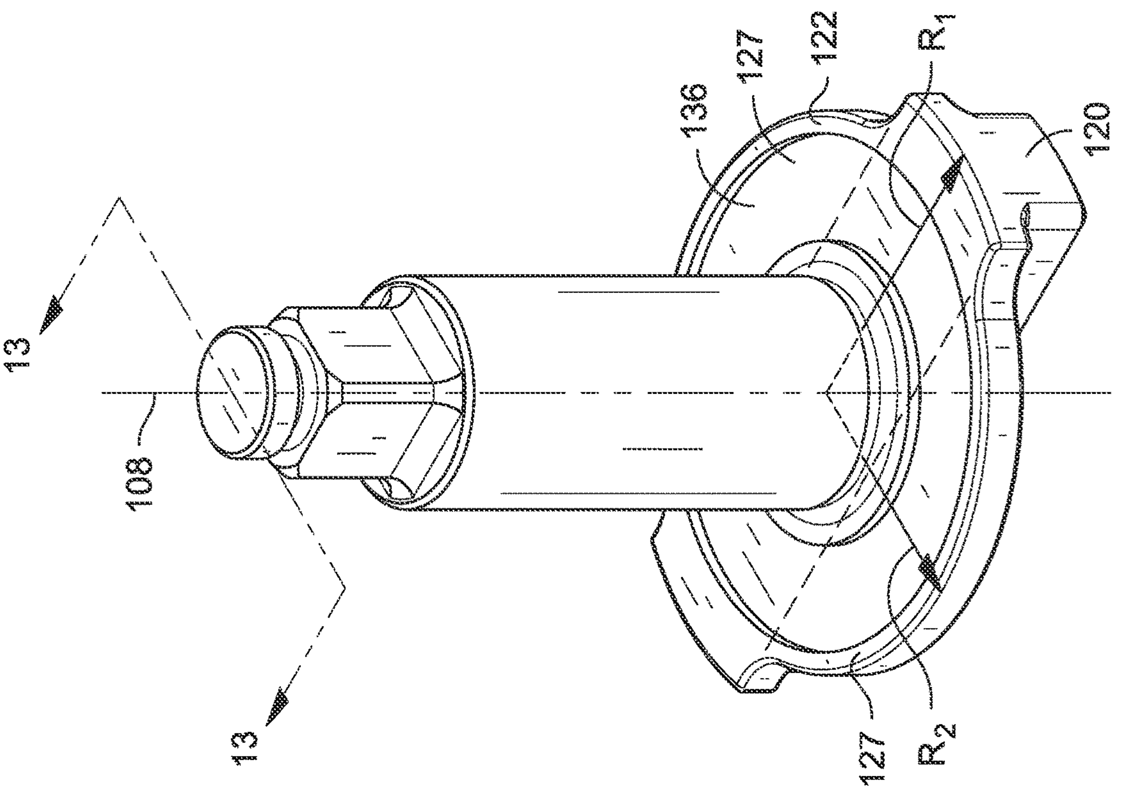
Figure 10:
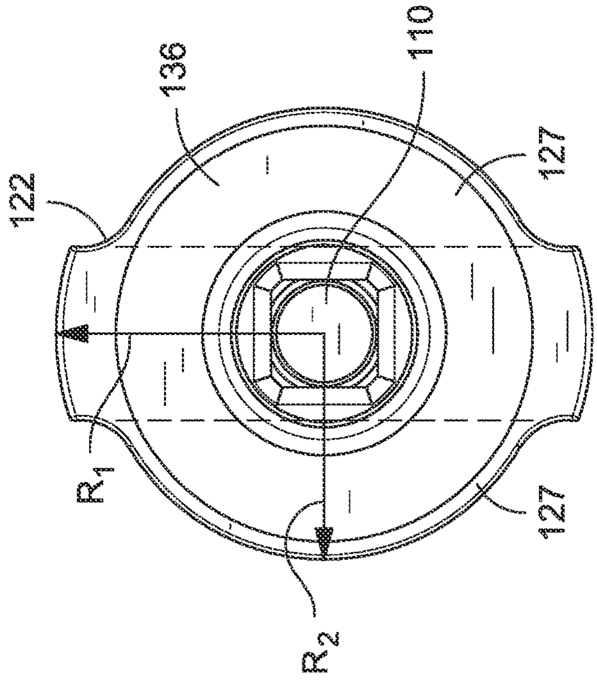

FIG. 10 is a top view of an anvil having a flange and a magnet cavity in accordance with example embodiments of the present disclosure FIG. 11 is a perspective view of the anvil of FIG. 10 in accordance with example embodiments of the present disclosure.

Figure 12:
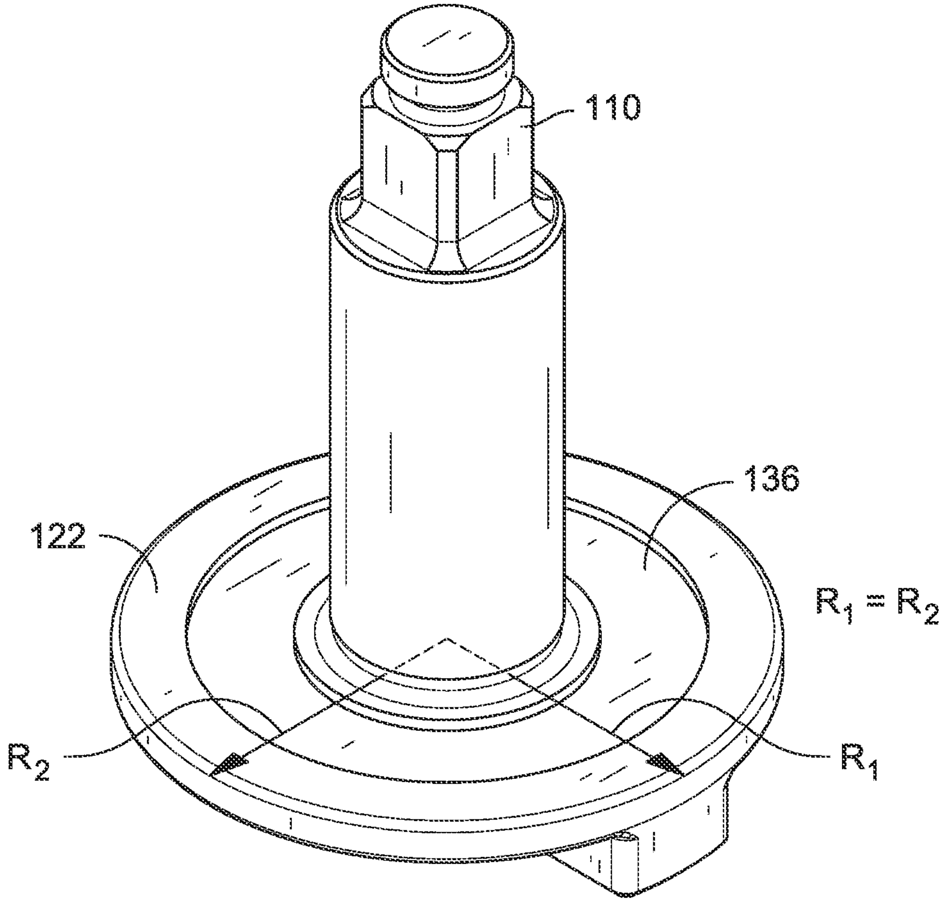

FIG. 12 is a perspective view of an anvil having a flange with a constant radius and a magnet cavity in accordance with example embodiments of the present disclosure.

Figure 13:
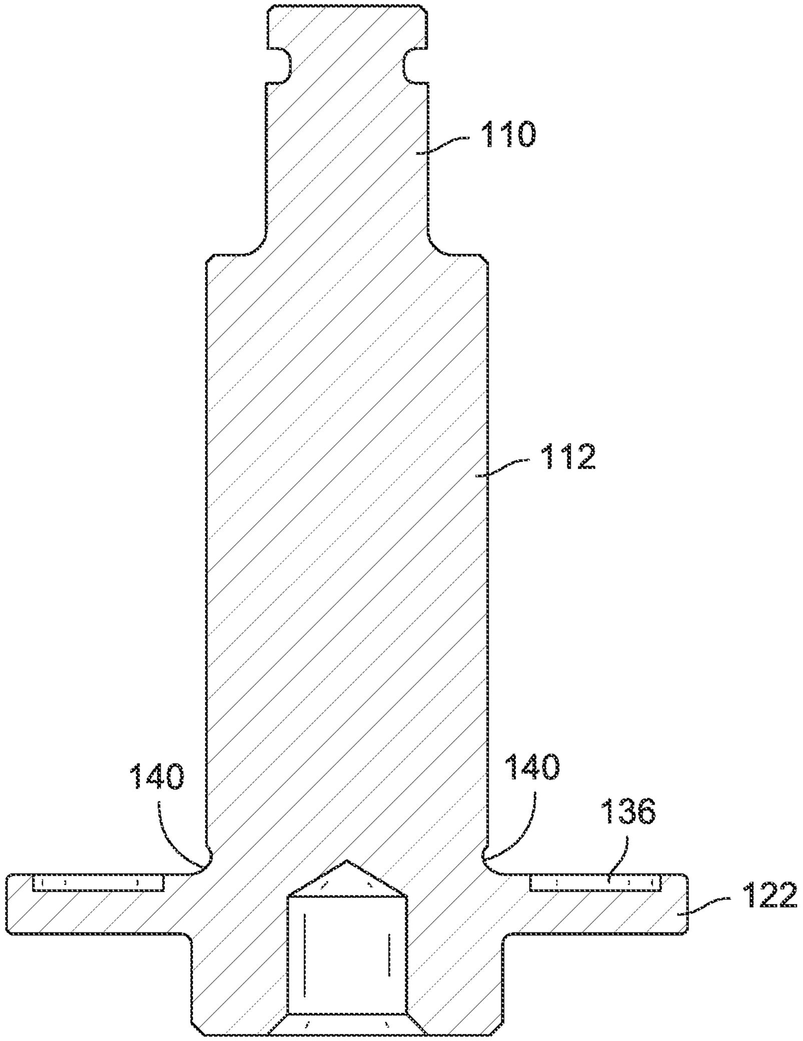

FIG. 13 is a cross-sectional side view of the anvil of FIG. 12 having a chamfer at the base of the anvil that is tangential to the magnet cavity in accordance with example embodiments of the present disclosure.

Figure 14:
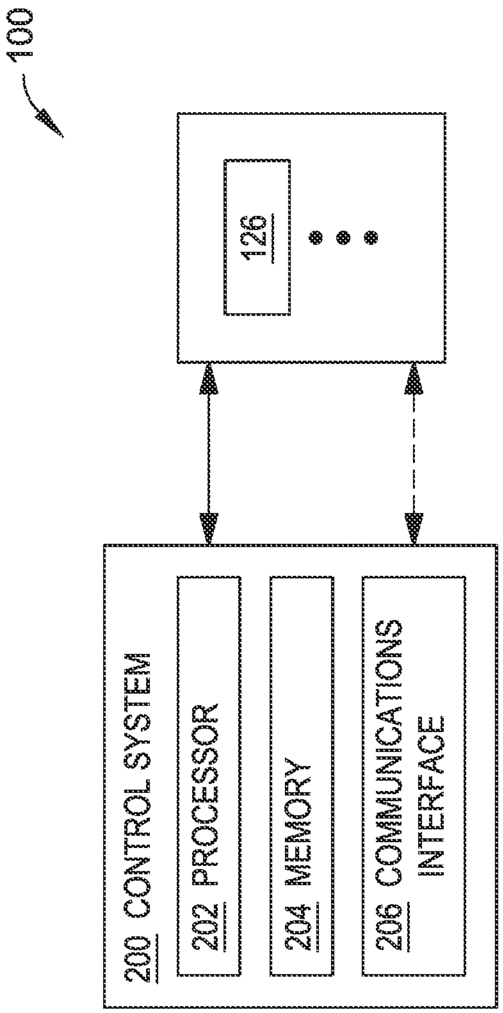

FIG. 14 is a control system in communication with the rotary power tool in accordance with example embodiments of the present disclosure.

DETAILED DESCRIPTION

For the purposes of promoting an understanding of the principles of the subject matter, reference will now be made to the embodiments illustrated in the drawings and specific language will be used to describe the same. It will nevertheless be understood that no limitation of the scope of the subject matter is thereby intended. Any alterations and further modifications in the described embodiments, and any further applications of the principles of the subject matter as described herein are contemplated as would normally occur to one skilled in the art to which the subject matter relates.

OVERVIEW

Referring generally to FIGS. 1 through 13, a rotary power tool assembly having a high-resolution angle sensor is described. Rotary power tools (e.g., impact wrenches) are designed to deliver a high torque output with minimal exertion by the user. A rotating mass (e.g., a hammer) stores energy and abruptly delivers the stored energy to an anvil connected to an output shaft, subjecting the anvil to repeated and sudden shock loading. As the rotating mass drives the anvil and the output shaft, it may be necessary to determine the angular velocity or the position of the rotating anvil.

Rotary power tools may include optical or magnetic sensors that track the angle of rotating teeth elements. Currently, toothed gear encoder sensors sense rotating teeth cut into the periphery of the rotating element. The resolution of this type of sensor is limited by the fineness of the teeth, the number of sensors in a sensor array, and the sensor's ability to sense fine changes in flux of the rotating teeth. For very small incremental motions, e.g., incremental motions of less than one degree (1°), these sensors may not accurately measure the angle of rotation of a rotating element. For example, if twenty (20) impacts occur, each of which rotate in less than half degree (0.5°) increments, a toothed gear encoder may return a total angle of zero degrees (0°) depending on its programmed algorithm.

Increments in angle rotation when tightening a bolt, particularly towards the end of the tightening process, may be small but numerous. If the sensor resolution is low, errors can accumulate quickly leading to inaccurate torque configurations. The rotary power tool assembly described herein includes an anvil angle sensor comprising a magnetic encoder sensor with a high resolution, e.g., a resolution of under about one degree (0.1°). The anvil angle sensor is placed in close proximity with a magnet attached to a flange of the rotating anvil. The magnet is adhered to the flange of the anvil to withstand the constant shock-loading of the hammer on the anvil during the use of the rotary power tool assembly. The angle sensor can be used to approximate the rotation of a bolt head to achieve control strategies that include angle-of-turn torque targets. The anvil angle measured may be relative to a housing or hammercase of the power tool assembly. During operation, the power tool assembly is held firmly by a user to minimize angular movement of the hammercase.

The anvil angle sensor can be used in conjunction with a control system to process the angle of the desired bolt turn, make a decision, and shut down the rotary power tool if the desired torque has been achieved.

DETAILED DESCRIPTION OF EXAMPLE EMBODIMENTS

FIG. 1 shows an illustrative embodiment of a rotary power tool assembly 100 in accordance with the present disclosure. As shown, the rotary power tool assembly 100 includes hammercase 102 having a forward end 104 and a rearward end 106. The hammercase 102 contains a drive mechanism 101 that drives a rotating rod, which drives a gear set assembly (not shown). The gear set assembly rotates a cam shaft 116, which, in turn, rotates a hammer 114 via a cam ball 103 that engages both the cam shaft 116 and the hammer 114. Rotating the hammer 114 draws it against the bias of a spring 105 towards the rearward end 106 until the hammer 114 is released, moving it towards the forward end 104 as well as rotating the hammer 114 about an axis 108. The hammer 114 impacts an anvil 112 causing the anvil 112 to rotate. Repeating this process results in the hammer 114 to create continuous intermittent impacts against the anvil 112 causing it to continually rotate. An output shaft 110 extends from the anvil 112 and may receive a connector or other device that engages a fastener (e.g., a bolt, a nut, a screw, etc.) to be tightened or loosened.

In embodiments, the drive mechanism 101 comprises an electric motor (not shown) powered by a power source such as a removable battery (in the configuration shown), an internal battery or an external power source via an electric cord. However, it is contemplated that the rotary power tool assembly 102 may also comprise a pneumatic tool having a drive mechanism 101 employing a pneumatic (compressed air) motor powered by a source of compressed air.

Figure 2:
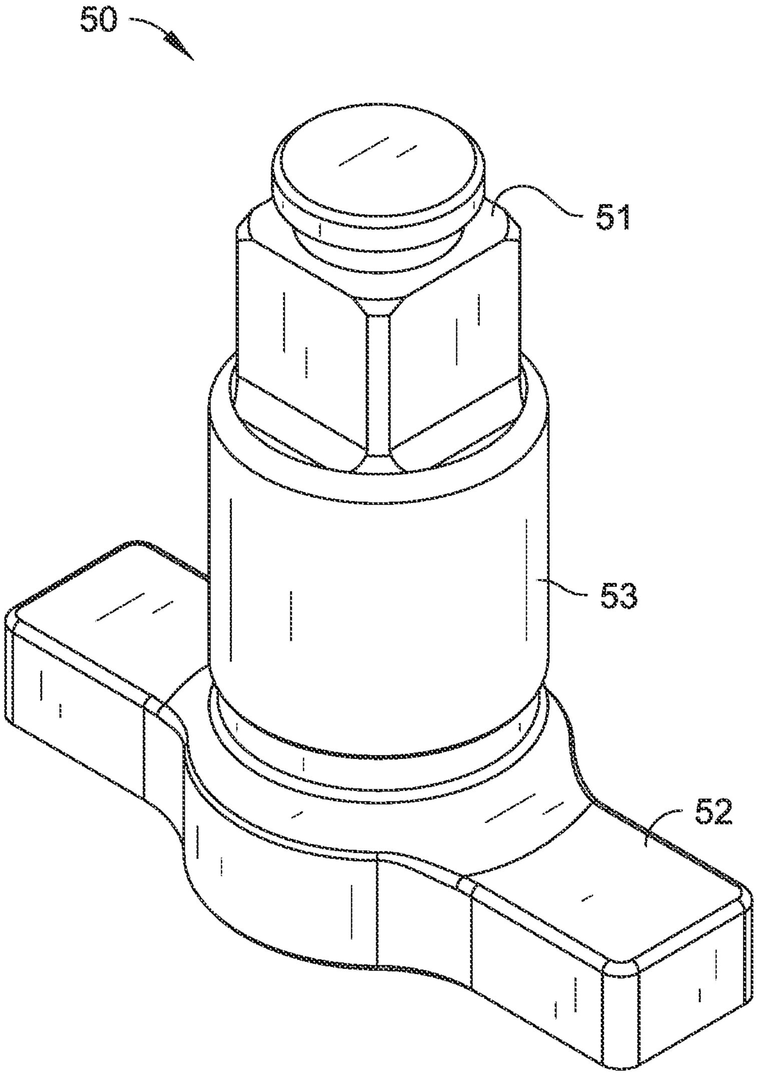
FIG. 2 is a perspective view illustrating an anvil having a plurality of anvil jaws and connected to an output shaft.

With reference to FIG. 2, an anvil 50 is illustrated having a plurality of jaws 52 and an output shaft 51 connected by a bearing surface 53. FIG. 3 illustrates a disc magnet 124 and an angle sensor 126 having a magnetic encoder sensor chip 130 (shown side by side and not to scale). The disc magnet 124 is divided into a plurality of radially tapered (pie-shaped) magnetic poles, where alternating north and south poles are adjacent to one another, and respective north and south poles are grouped into magnetic pole pairs 125. A width A of an arc length at a radius B of each magnetic pole pair 125 may be matched with the width of a sensor array C in the magnetic encoder sensor chip 130 for improving the resolution of the angle sensor 126. In embodiments, for each given magnetic pole pair 125, the angle sensor 126 may produce a predetermined number of pulses (e.g., forty (40) pulses) when rotating in front of the magnetic encoder sensor chip 130. The magnetic encoder sensor chip 130 may employ a magnetic quadrature encoder, which is an incremental encoder with two (2) out-of-phase output channels. Thus, the magnetic quadrature encoder counts the leading and trailing edges of a pulse train in both output channels to quadruple the number of pulses generated per revolution. The number of magnetic pole pairs 125 determines the resolution of the angle sensor 126. For example, with a quadrature magnetic encoder, if a disc magnet 124 included twenty-four (24) magnetic pole pairs 125, the angle sensor 126 produces 3,840 pulses per revolution of the disc magnet 124, providing an accuracy of 0.09375 deg/pulse. It should be noted that this example is not limiting and the magnet 124 may have a different number of magnetic pole pairs 125 or have different shape (e.g., circular, etc.). The position of the anvil 112 measured is relative to the orientation of the hammercase 102. The determined angle of the anvil may be affected by angular movement of the hammercase during operation. For example, if the hammercase 102 moves during operation, the angle determined by the angle sensor 126 may not entirely reflect the angular movement of the fastener that is being tightened or loosened.

Figure 5:
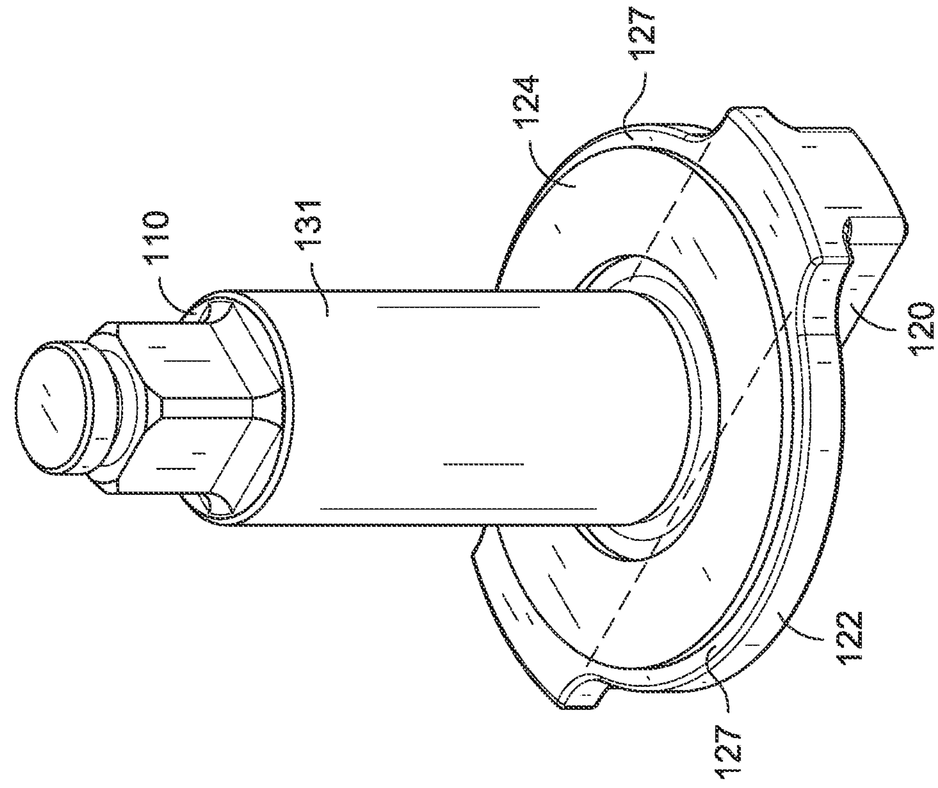
FIG. 5 is a perspective view illustrating the anvil of FIG. 4 having a disc magnet adhered to the flange opposite to the plurality of anvil jaws, in accordance with example embodiments of the present disclosure.
Figure 4:
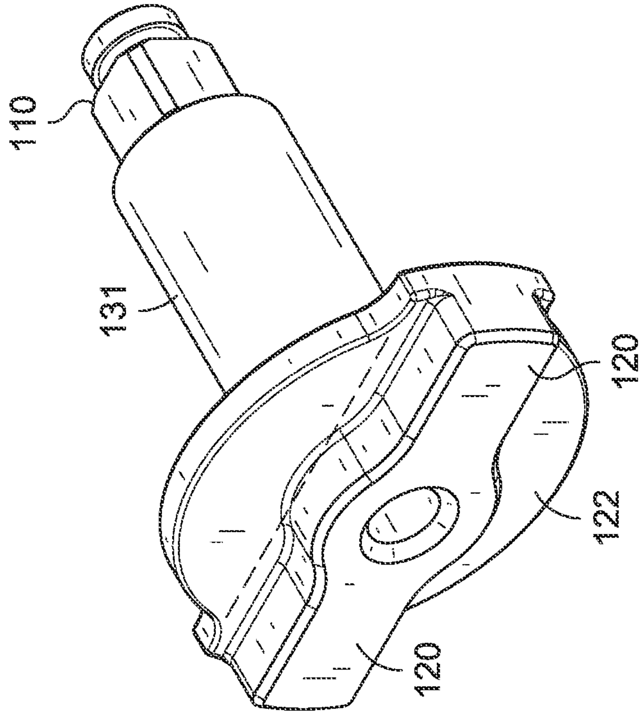
FIG. 4 is a perspective view illustrating an anvil having an output shaft, a plurality of anvil jaws and a flange, in accordance with example embodiments of the present disclosure.

FIGS. 4 and 5 show an example embodiment of anvil 112 having an output shaft 110, a plurality of anvil jaws 120, a flange 122, and a disc magnet 124. As shown, the disc magnet 124 is attached to the flange 122 on the opposite side of the plurality of anvil jaws 120 and is concentric with the output shaft 110. The disc magnet 124 may be bonded in place to the flange 122 using a high-strength and/or heat-resistant adhesive, such as flexible liquid epoxy glue. However, it should be understood that other high-strength and/or heat-resistant adhesives may be used to secure the disc magnet 124 in place. The disc magnet 124 may be aligned and secured to the flange 122 to withstand the repeated shock loading of the hammer 114 for the life of the tool. In example embodiments, the anvil 112 and/or the disc magnet 124 may be removable from the rotary power tool assembly 100 and interchanged with a different anvil/disc magnet, respectively, based on the desired resolution of the anvil angle sensor 112 for a given application. In example embodiments, a magnetic composite material may be over-molded directly unto the flange 122 of anvil 112 directly instead of molded into the separate disc magnet 124. In example embodiments, the magnet disc 124 is composed of a porous magnetic material, including but not limited to ferromagnetic ceramics like barium ferrite or strontium ferrite.

Referring to FIGS. 6 and 7, the front end of the hammercase 102 is shown. The anvil 112 is mounted on the hammercase 102 so that the output shaft 110 extends through the hammercase 120. A spacer 132 separates and supports the flange 122 from the hammercase 102. In the embodiment shown, the angle sensor 126 comprises a sensor board 128 that is mounted to an inner surface 125 of the hammercase 120. The magnetic encoder sensor chip 130 is mounted on the sensor board 128 directly facing the disc magnet 124 attached to the flange 122. The distance (gap) between the disc magnet 124 and the anvil angle sensor 126 is selected based on sensing range of the magnetic encoder sensor chip 130, the magnetic field strength of the magnetic pole pairs 124, and so forth. In example embodiments, the distance between the disc magnet 124 and the anvil angle sensor 126 is less than three millimeters (3 mm) (e.g., between one millimeter (1 mm) and two millimeters (2 mm)). However, it should be understood that the distance between the disc magnet 124 and the anvil angle sensor 126 may be greater than or lesser than in the example embodiments described above. In example embodiments, a spacer (not shown) may be included behind the disc magnet 124 and/or the anvil angle sensor 126 during manufacturing for adjusting the distance between them.

As shown in FIG. 3, since the highest resolution of the anvil angle sensor 126 is obtained when the width A of the arc length at the radius B of each magnetic pole pair 125 corresponds to the width of the sensor array C, the angle accuracy of the anvil angle sensor 126 is affected by the concentricity of the disc magnet 124 in relation to the axis 108. Thus, deviation of the magnetic pole pair width from a programmed/calibrated width may create an angle reading error. One cause of deviation in concentricity of the disc magnet 124 is the placement of the disc magnet 124 on the flange 122. It should be noted that although the highest resolution of the anvil angle sensor 126 is obtained when the width A of the arc length at the radius B of each magnetic pole pair 125 corresponds to the width of the sensor array C, the present disclosure is not limited to having equal widths A and C, it is contemplated that the width of the sensor array C may be less than or greater than the width A of the arc length of the magnetic pole pair 125.

In example embodiments, shown in FIGS. 8 and 9, the magnet disc 124 is positioned within a magnet cavity 136 disposed within the flange 122. The magnet cavity 136 supports the magnet disc 124 against radial accelerations associated with the continuous impacts of the hammer 114. The magnet cavity 136 helps create a better seal between the high-strength adhesive and the edges of the magnet disc 124, limiting infiltration of grease and/or oil that may reduce the strength of the magnetic material, as well as weaken the adhesion of the disc magnet 124 to the flange 122.

In example embodiments, a piloting surface 129 may be disposed concentric with the axis 108 and an anvil bearing surface 131. For example, the piloting surface 129 may be cut concentric with the axis 108 as shown in FIGS. 8 and 9. The magnet disc 124 may be aligned with the piloting surface 129 at an inner diameter ID and have a gap 134 between an outer diameter OD and an inner edge of the magnet cavity 136, as shown in FIG. 8. Aligning the piloting surface 129 on one of the diameters of the magnet disc 124 allows the magnet disc 124 to maintain its alignment while withstanding the repeated shock loading from the hammer 114. However, in other embodiments, the magnet disc 124 may be aligned with the piloting surface 129 at the outer diameter OD and have a gap 134 between the inner diameter ID and the inner edge of the magnet cavity 136 as shown in FIG. 9. In further embodiments (not shown) the magnet disc 124 may be aligned with a piloting surface 129 at both the inner diameter ID and the outer diameter OD (not shown).

In example embodiments, the flange 122 may extend over the plurality of anvil jaws 120 and include a plurality of arcuate protrusions 127 between the plurality of anvil jaws 120. The flange 122 may extend from the output shaft 110 to a first radial distance $R_1$ equal to the radial length of the plurality of anvil jaws 120 and to a second radial distance $R_2$ between each of the plurality of anvil jaws 120. In example embodiments the first radial distance $R_1$ is longer than the second radial distance $R_2$, as shown in FIGS. 8 through 11. In this example embodiment, there is less material in the periphery of the flange 122 in the areas on either side of the plurality of anvil jaws 120, reducing the mass of the anvil 112, and consequently, reducing the inertia of the anvil 112 when it is hit by the hammer 114 without reducing the strength of the output shaft 110 or the magnet cavity 136. In example embodiments, the flange 122 may include a fillet 140 extending from the base of the anvil 112 and tangential with the magnet cavity 136 as shown in FIG. 13.

In other example embodiments the first radial distance $R_1$ and the second radial distance $R_2$ is the same distance, and the flange is generally circular around the output shaft 110, as shown in FIG. 12. It should be noted that the flange 122 may have more than the first and the second radial distances extending from the output shaft 110.

The rotary power tool assembly 100 may be coupled with a control system 200 for controlling the rotation of the output shaft 110, as shown in FIG. 14. The controller may include a processor 202, a memory 204, and a communications interface 206. The processor provides processing functionality for the control system and can include any number of processors, microcontrollers, or other processing systems, and resident or external memory for storing data and other information accessed or generated by the control system.

Although the subject matter has been described in language specific to structural features and/or process operations, it is to be understood that the subject matter defined in the appended claims is not necessarily limited to the specific features or acts described above. Rather, the specific features and acts described above are disclosed as example forms of implementing the claims.

What is claimed is:

1. A rotary power tool assembly comprising:
a hammercase having a forward end and a rearward end and defining an axis extending between the forward end and the rearward end;
a drive mechanism housed within the hammercase;
a hammer driven by the drive mechanism to apply a rotational impact force on an anvil;
the anvil having:
a longitudinally extending output shaft rotatable about the axis and supported in the forward end of the hammercase,
a plurality of anvil jaws extending from the axis, and
a flange fixedly connected to an end of the output shaft and extending radially from the axis, wherein the flange supports the plurality of anvil jaws, the flange extending over the plurality of anvil jaws and defining a plurality of arcuate protrusions on opposing coplanar sides of the flange between the plurality of anvil jaws, where the flange and the plurality of arcuate protrusions define a magnet-facing surface;
a magnetic disc directly attached to the magnet-facing surface of the flange, opposite to the plurality of anvil jaws, the magnetic disc having arc sectors divided into alternating north and south magnetic poles grouped into magnetic pole pairs; and
an anvil angle sensor attached to a front-end inner surface of the hammercase axially facing the magnetic disc, wherein the anvil angle sensor is configured to read and interpret magnetic flux changes of the magnetic pole pairs and determine the position of the anvil rotating about the axis.

2. The rotary power tool assembly of claim 1, wherein the anvil angle sensor includes a magnetic encoder sensor chip.

3. The rotary power tool assembly of claim 2, wherein the anvil angle sensor includes an array of sensors disposed on the magnetic encoder sensor chip, the array of sensors disposed in a row on the magnetic encoder sensor chip.

4. The rotary power tool assembly of claim 3, wherein the anvil angle sensor is positioned at a radius B from the axis, at which a width C of the array of sensors is equal to a width A of the arc length of the magnetic pole pairs.

5. The rotary power tool assembly of claim 1, wherein a distance between the anvil angle sensor and the magnet is less than 3 mm.

6. The rotary power tool assembly of claim 1, wherein an outer radial distance of the plurality of arcuate protrusions is less than or equal to the radial distance of the plurality of jaws.

7. The rotary power tool assembly of claim 1, wherein the magnet-facing surface defines a magnet cavity, the magnet cavity configured to retain the magnet against radial accelerations.

8. The rotary power tool assembly of claim 1, wherein the anvil angle sensor includes a control system to process the angle of the anvil, determine the angle of the anvil and change a configuration of the rotary power tool assembly based on the angle of the anvil.

9. The rotary power tool assembly of claim 8, wherein the control system shuts off the rotary power tool assembly based on the determined angle of the anvil.

10. An anvil for a rotary power tool comprising:
a longitudinally extending output shaft rotatable about an axis and supported in a forward end of a hammercase,
a plurality of anvil jaws extending from the axis, and
a flange fixedly connected to an end of the output shaft and extending radially from the axis, wherein the flange supports the plurality of anvil jaws, the flange extending over the plurality of anvil jaws and defining a plurality of arcuate protrusions on opposing coplanar sides of the flange between the plurality of anvil jaws, where the flange and the plurality of arcuate protrusions define a magnet-facing surface; and
a magnetic disc directly attached to the magnet-facing surface of the flange, opposite to the plurality of anvil jaws, the magnetic disc having arc sectors divided into alternating north and south magnetic poles grouped into magnetic pole pairs; and
an anvil angle sensor attached to a front-end inner surface of the hammercase that axially faces the magnetic disc, the anvil angle sensor configured to read and interpret magnetic flux changes of the magnetic pole pairs and determine the position of the anvil rotating about the axis.

11. The anvil of claim 10, wherein an outer radial distance of the plurality of arcuate protrusions is less than or equal to the radial distance of the plurality of jaws.

12. The anvil of claim 10, wherein magnet-facing surface includes a magnet cavity, the magnet cavity configured to retain the magnet against radial accelerations.

13. The anvil of claim 10, wherein a distance between the anvil angle sensor and the magnet is less than 3 mm.

14. The anvil of claim 10, wherein the anvil angle sensor includes an array of sensors disposed on the magnetic encoder sensor chip.

15. The anvil of claim 14, wherein the array of sensors is disposed in a row on the magnetic encoder sensor chip.

16. The anvil of claim 15, wherein the anvil angle sensor is positioned at a radius B from the axis, at which a width C of the array of sensors is equal to a width A of the arc length of the magnetic pole pairs.

17. A rotary power tool assembly comprising:
a hammercase having a forward end and a rearward end and defining an axis extending between the forward end and the rearward end;
a drive mechanism housed within the hammercase;
a hammer driven by the drive mechanism to apply a rotational impact force on an anvil;
the anvil having:
a longitudinally extending output shaft rotatable about the axis and supported in the forward end of the hammercase,
a plurality of anvil jaws extending from the axis, and
a flange fixedly connected to an end of the output shaft and extending radially from the axis, wherein the flange supports the plurality of anvil jaws, the flange extending over the plurality of anvil jaws and defining a plurality of arcuate protrusions on opposing coplanar sides of the flange between the plurality of anvil jaws, where the flange and the plurality of arcuate protrusions define a magnet-facing surface;
a magnetic disc directly attached to the magnet-facing surface of the flange, opposite to the plurality of anvil jaws, the magnetic disc having arc sectors divided into alternating north and south magnetic poles grouped into magnetic pole pairs; and
an anvil angle sensor attached to a front-end inner surface of the hammercase axially facing the magnetic disc, wherein the anvil angle sensor is configured to read and interpret magnetic flux changes of the magnetic pole pairs and determine the position of the anvil rotating about the axis, and wherein the anvil angle sensor includes a control system to process the angle of the anvil, determine the angle of the anvil and change a configuration of the rotary power tool assembly based on the angle of the anvil.

18. The rotary power tool assembly of claim 17, wherein a distance between the anvil angle sensor and the magnet is less than 3 mm.

19. The rotary power tool assembly of claim 17, wherein the anvil angle sensor includes an array of sensors on a magnetic encoder sensor chip, the array of sensors disposed in a row.

20. The rotary power tool assembly of claim 19, wherein the anvil angle sensor is positioned at a radius B from the axis, at which a width C of the array of sensors is equal to a width A of the arc length of the magnetic pole pairs.

* * * * *